United States Patent
Clarkson et al.

(10) Patent No.: US 10,221,718 B2
(45) Date of Patent: Mar. 5, 2019

(54) FAN CASES AND MANUFACTURE METHODS

(71) Applicant: United Technologies Corporation, Hartford, CT (US)

(72) Inventors: Steven C. Clarkson, Cheshire, CT (US); Thomas J. Robertson, Jr., Glastonbury, CT (US); Michael Parkin, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 272 days.

(21) Appl. No.: 14/914,840

(22) PCT Filed: Aug. 15, 2014

(86) PCT No.: PCT/US2014/051231
§ 371 (c)(1),
(2) Date: Feb. 26, 2016

(87) PCT Pub. No.: WO2015/076882
PCT Pub. Date: May 28, 2015

(65) Prior Publication Data
US 2016/0201505 A1    Jul. 14, 2016

Related U.S. Application Data

(60) Provisional application No. 61/875,243, filed on Sep. 9, 2013.

(51) Int. Cl.
*F01D 25/00* (2006.01)
*F01D 11/08* (2006.01)
(Continued)

(52) U.S. Cl.
CPC ............ *F01D 25/005* (2013.01); *F01D 11/08* (2013.01); *F01D 21/045* (2013.01); *F01D 25/243* (2013.01); *F02C 7/20* (2013.01); *F02K 3/06* (2013.01); *F05D 2220/32* (2013.01); *F05D 2240/12* (2013.01); *F05D 2240/14* (2013.01);
(Continued)

(58) Field of Classification Search
CPC ...... F01D 25/005; F01D 25/243; F01D 11/08; F01D 21/045; F02C 7/20
See application file for complete search history.

(56) References Cited

U.S. PATENT DOCUMENTS 7,287,957 B2   10/2007   Jahns et al.
8,016,543 B2   9/2011    Braley et al.
(Continued)

FOREIGN PATENT DOCUMENTS

EP    1013894 A2    6/2000

OTHER PUBLICATIONS

International Search Report and Written Opinion for PCT/US2014/051231, dated Jun. 8, 2015.

*Primary Examiner* — Logan Kraft
*Assistant Examiner* — Eric Zamora Alvarez
(74) *Attorney, Agent, or Firm* — Bachman & LaPointe, P.C.

(57) ABSTRACT

A turbine engine fan case (48) comprises a composite body member (300) circumscribing an axis (500) and having an annular mounting portion (310, 410), a segmented polymer member (320, 330, 420, 440) along the annular mounting portion, and integrated therewith.

20 Claims, 10 Drawing Sheets

(51) Int. Cl.
*F01D 21/04* (2006.01)
*F01D 25/24* (2006.01)
*F02K 3/06* (2006.01)
*F02C 7/20* (2006.01)

(52) U.S. Cl.
CPC .... *F05D 2300/43* (2013.01); *F05D 2300/603* (2013.01); *F05D 2300/614* (2013.01); *Y02T 50/672* (2013.01)

(56) References Cited

U.S. PATENT DOCUMENTS

| | | |
|---|---|---|
| 8,475,895 B2 | 7/2013 | Xie |
| 2008/0157418 A1 | 7/2008 | Blanton et al. |
| 2009/0226310 A1 | 9/2009 | Finn et al. |
| 2012/0067515 A1 | 3/2012 | Dahl et al. |
| 2012/0082541 A1 | 4/2012 | Macchia et al. |
| 2012/0099975 A1 | 4/2012 | Robertson, Jr. et al. |
| 2012/0148392 A1* | 6/2012 | Lussier ............... F01D 21/045 415/200 |
| 2012/0224949 A1 | 9/2012 | Harper et al. |
| 2013/0071234 A1 | 3/2013 | Dimelow |
| 2013/0195605 A1 | 8/2013 | Robertson et al. |

* cited by examiner

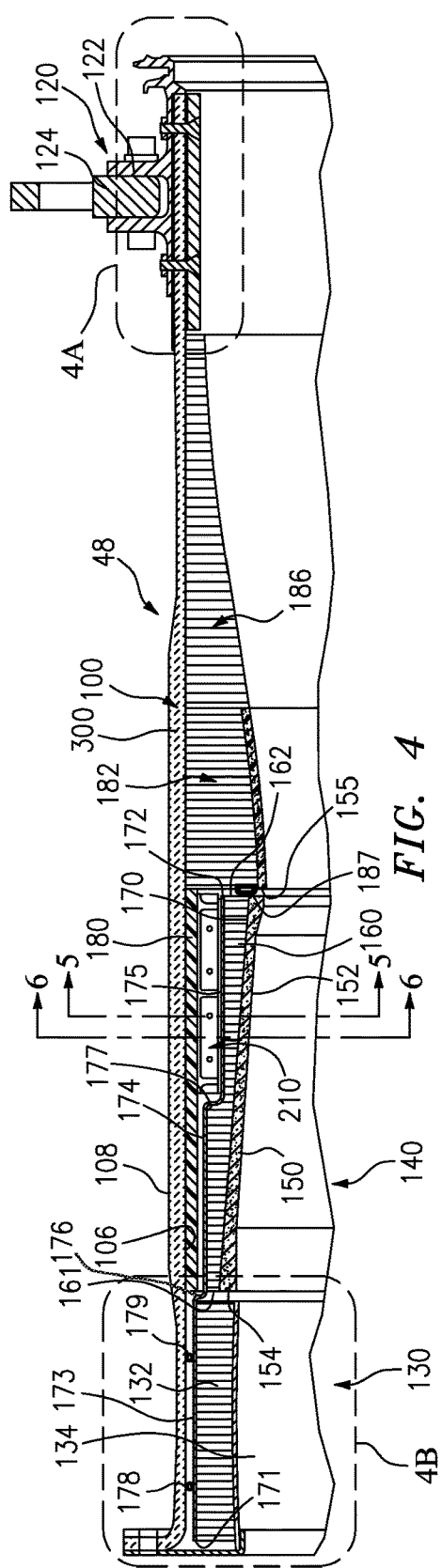
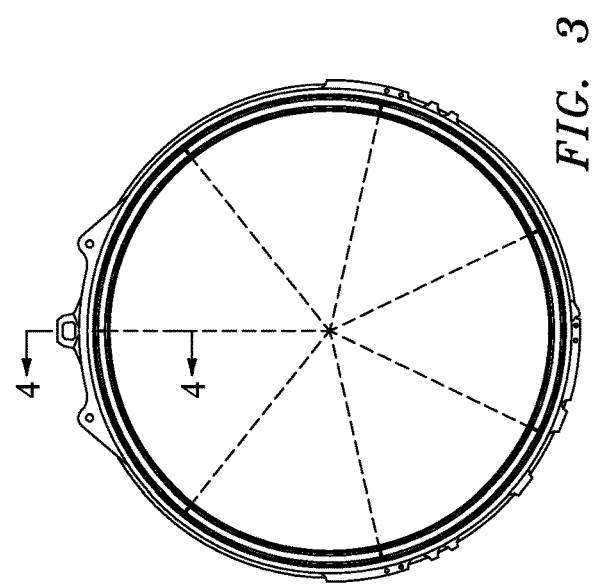
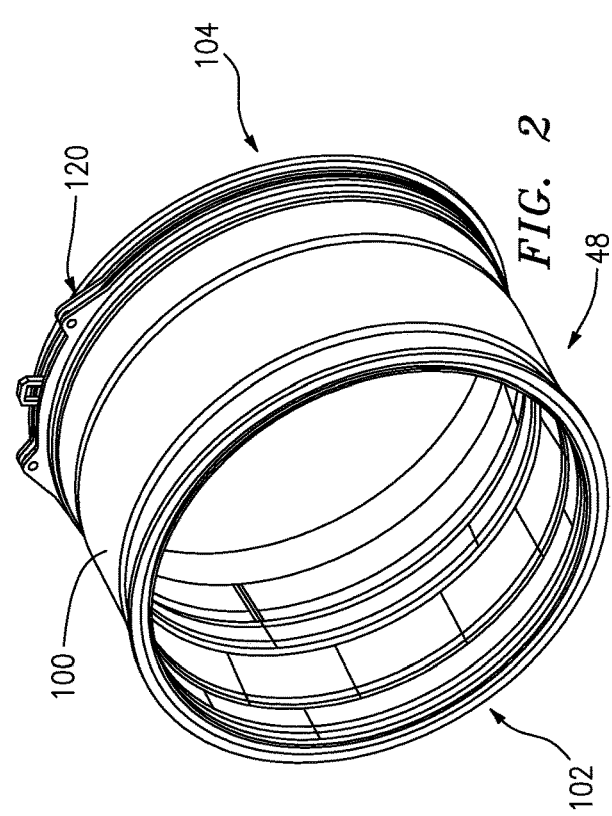

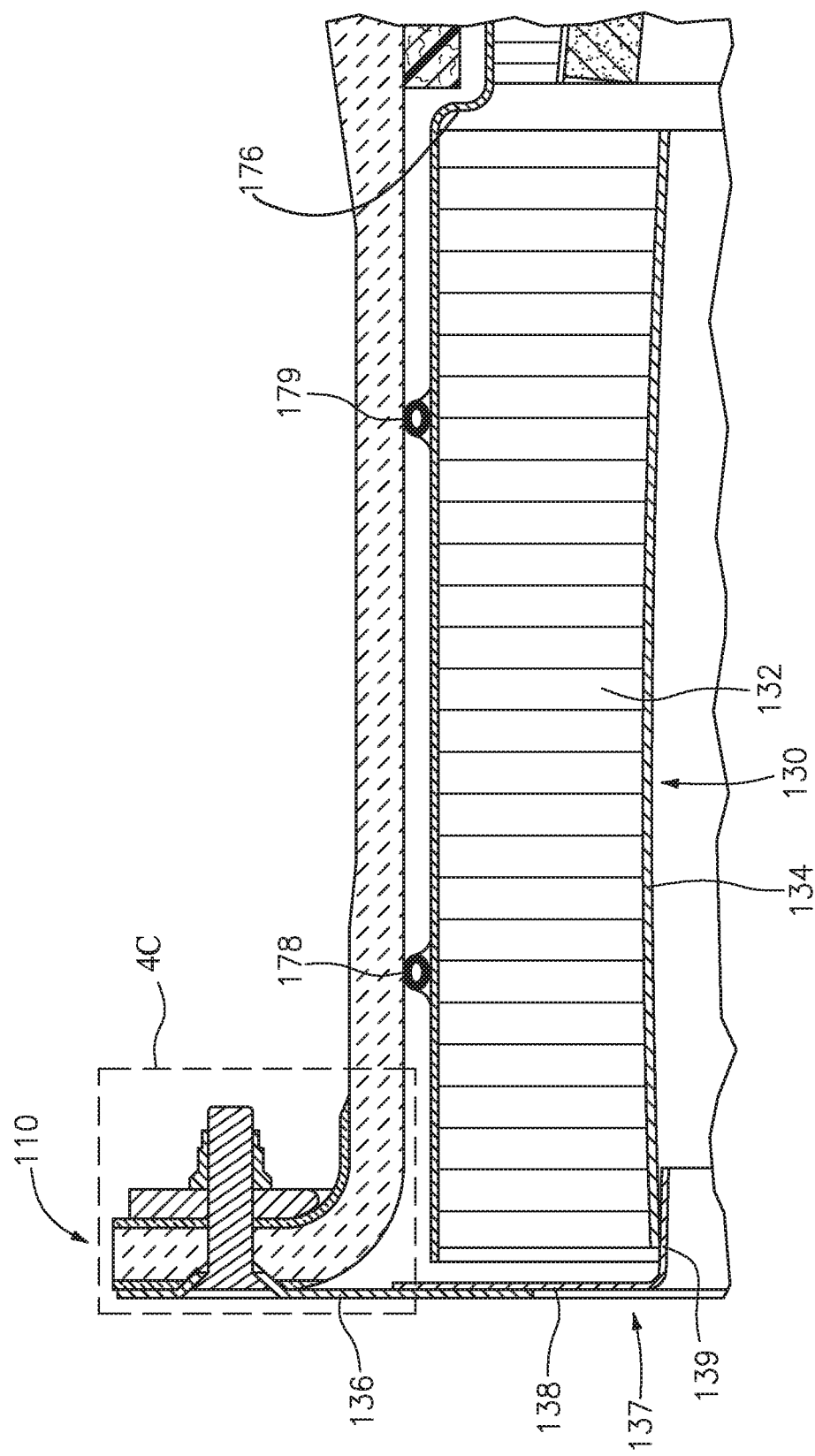

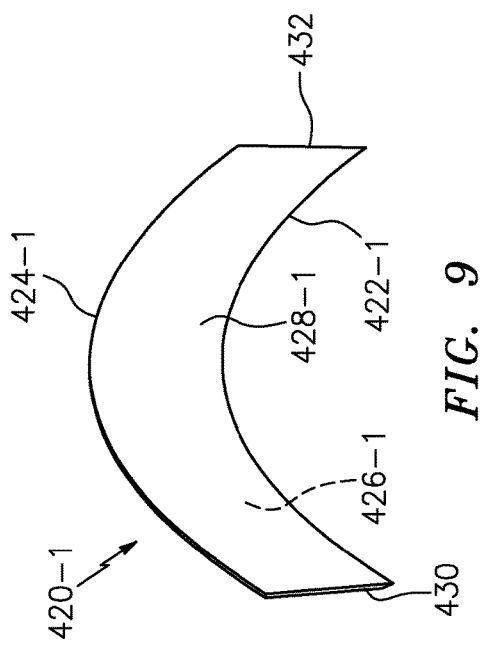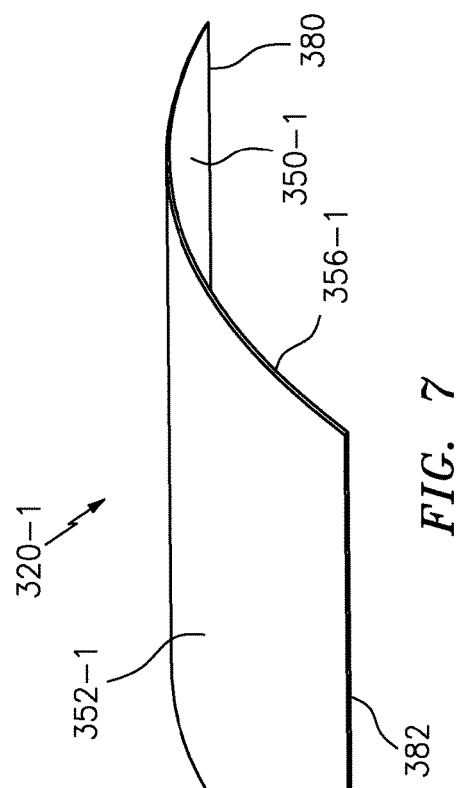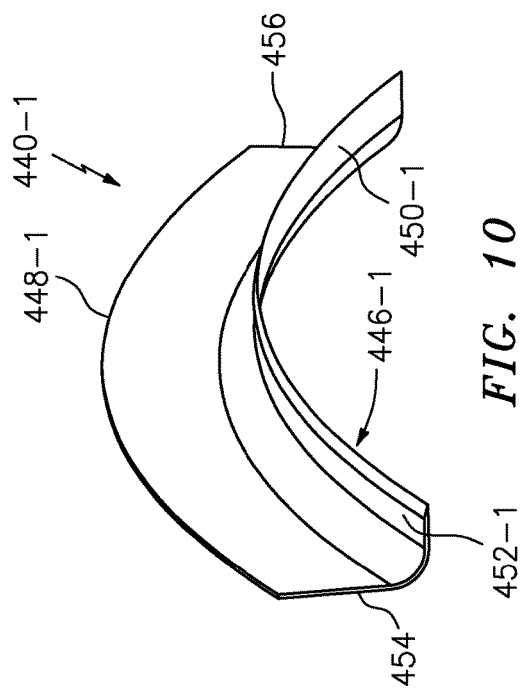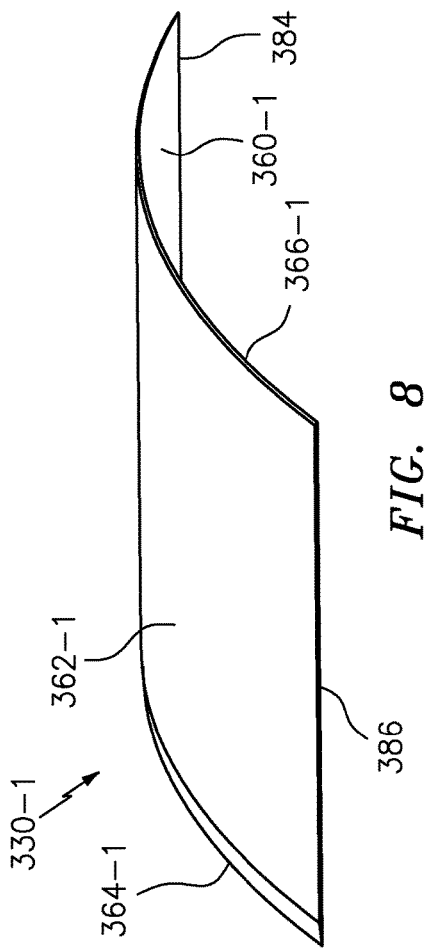

FAN CASES AND MANUFACTURE METHODS

CROSS-REFERENCE TO RELATED APPLICATION

Benefit is claimed of U.S. Patent Application Ser. No. 61/875,243, filed Sep. 9, 2013, and entitled "Fan Cases and Manufacture Methods", the disclosure of which is incorporated by reference herein in its entirety as if set forth at length.

BACKGROUND

The disclosure relates to turbine engine fan cases. More particularly, the disclosure relates to mounting of and to fan cases.

A gas turbine engine can include a fan section containing fan blades surrounded by a fan case within an aerodynamic nacelle. A function of the fan case is to contain fractured and separated parts of the fan blades, preventing any portions from leaving the fan nacelle. Metallic fan cases can be undesirably heavy to perform this containment function. A composite fan case constructed of non-metallic materials can reduce weight and provide the same containment capability as a metallic fan case.

The fan case may be mounted to a core of the engine via an array of fan exit guide vanes (FEGV). The fan case may also be mounted to a pylon of the aircraft. Additionally, a structural portion of the case may carry a liner for closely accommodating the fan blades. The liner may be configured to have different thermal expansion than the composite structural portion of the fan case. The difference allows the liner to closely accommodate the fan across a range of operating conditions.

US Patent Application Publication 2013-0195635-A1, published Aug. 1, 2013 "Fan Case Rub System", US Patent Application Publication 2013-0195605-A1, published Aug. 1, 2013 "Fan Case Rub System, Components, and Their Manufacture", and US Patent Application Publication 2012-0099975-A1, published Apr. 26, 2012 "Fan Case and Mount Ring Snap Fit Assembly" disclose composite fan cases for turbofan engines. Some such cases feature fiberglass layers in the composite layup (e.g., atop carbon fiber layers) along mounting surfaces (e.g., for mounting the fan case to an engine mount (e.g., a front mount of a pylon with a rear mount of the pylon engaging a core case) or a fan exit guide vane (FEGV) array or mounting the liner to the fan case).

In several examples, a metallic mount ring encircles a rear portion of the composite in an interference fit. Outer shrouds of the vanes of the FEGV array are radially inboard thereof and may be secured through the composite to the mount ring. In such situations, fiberglass layers inboard and outboard may serve to galvanically isolate the structural carbon fiber material from the metallic components. The buildup of fiberglass may also provide a margin for machining an otherwise imprecise composite to precise dimensions.

Similarly, such composite cases may include liner mounting features. One example involves a forward radially outwardly protruding flange to which a liner carrier may be mounted or to which a forward portion of the nacelle may be mounted. Again, one or both faces of the flange may be formed by fiberglass layers of the composite layup sandwiching the core structural carbon fiber material.

SUMMARY

One aspect of the disclosure involves a turbine engine fan case comprising: a composite body member circumscribing an axis and having an annular mounting portion; and a segmented polymer member along the annular mounting portion and integrated therewith.

A further embodiment may additionally and/or alternatively include the composite body member comprising a carbon fiber-reinforced composite.

A further embodiment may additionally and/or alternatively include the segmented polymer member being a segmented fiber-filled polymer member.

A further embodiment may additionally and/or alternatively include the fiber-filled polymer comprising glass fiber.

A further embodiment may additionally and/or alternatively include the fiber-filled polymer comprising polyetherimide (PEI) polymer.

A further embodiment may additionally and/or alternatively include the mounting portion being a flange.

A further embodiment may additionally and/or alternatively include a first said segmented fiber-filled polymer member being along a first face of the flange; and a second said segmented fiber-filled polymer member being along a second face of the flange opposite the first face to sandwich the flange between the first and second said segmented fiber-filled polymer members.

A further embodiment may additionally and/or alternatively include the mounting portion having an inner diameter surface and an outer diameter (OD) surface.

A further embodiment may additionally and/or alternatively include a first said segmented fiber-filled polymer member being along the ID surface and a second said segmented fiber-filled polymer member being along the OD surface.

A further embodiment may additionally and/or alternatively include a first said segmented fiber-filled polymer member being along the ID surface and a second said segmented fiber-filled polymer member being along the OD surface axially overlapping the first segmented fiber-filled polymer member.

A further embodiment may additionally and/or alternatively include a metallic member being mounted to said segmented polymer member.

A further embodiment may additionally and/or alternatively include the metallic member being selected from the group consisting of: a mounting ring; a fan exit guide vane array; and a liner capture plate.

A further embodiment may additionally and/or alternatively include the segmented fiber-filled polymer member having a characteristic thickness of 0.25 millimeters to 1.5 millimeters.

A further embodiment may additionally and/or alternatively include the segmented fiber-filled polymer member having a fiber content of 10% to 40% by weight.

A further embodiment may additionally and/or alternatively include the segmented fiber-filled polymer member having 4-30 segments.

A further embodiment may additionally and/or alternatively include the segmented fiber-filled polymer member combining for at least 300° of an annulus or may involve at least 359° or a full 360° (e.g., with overlapping joints).

A further embodiment may additionally and/or alternatively include a method for manufacturing the turbine engine fan case. The method comprises: laying up the composite body member; applying the segmented polymer member to the annular mounting portion; and curing the composite body member.

A further embodiment may additionally and/or alternatively include the segmented polymer member being of a first said segmented polymer member and a second segmented polymer member being applied to a mandrel and the laying up being atop the second segmented polymer member.

A further embodiment may additionally and/or alternatively include, after the applying and the curing, machining the segmented fiber-filled polymer member.

A further embodiment may additionally and/or alternatively include a method for using the turbine engine fan case. The method comprises fastening a metallic member to the segmented polymer member to the annular mounting portion.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 2 is a view of a fan containment case and liner assembly.

FIG. 3 is a transverse front end view of the assembly of FIG. 2.

FIG. 4 is a top axial sectional view of the assembly of FIG. 2.

FIG. 4B is an enlarged view of a forward portion of the forward liner cartridge region of the assembly of FIG. 4.

FIG. 7 is a view of a first molded sacrificial segment.

FIG. 8 is a view of a second molded sacrificial segment.

FIG. 9 is a view of a third molded sacrificial segment.

FIG. 10 is a view of a fourth molded sacrificial segment.

Like reference numbers and designations in the various drawings indicate like elements.

DETAILED DESCRIPTION

An exemplary implementation is discussed in the context of a modification of engines such as those in the US patent applications noted above. Modifications of other engines may have corresponding differences. In one or more of several locations, baseline fiberglass layers of the case lay-up may be replaced by molded members formed as a segmented annulus. In at least some embodiments, molding may save manufacturing costs over integrated lay-up of fiberglass plies. Segmentation may offer manufacturing and installation ease. For example molding a ring several meters in diameter may require a very large molding apparatus. Segmenting permits segments to be sized for production in common injection molding equipment. There may be economies of scale if the same mold may produce all segments or at least more than one segment in a given annulus.

Figure 1:
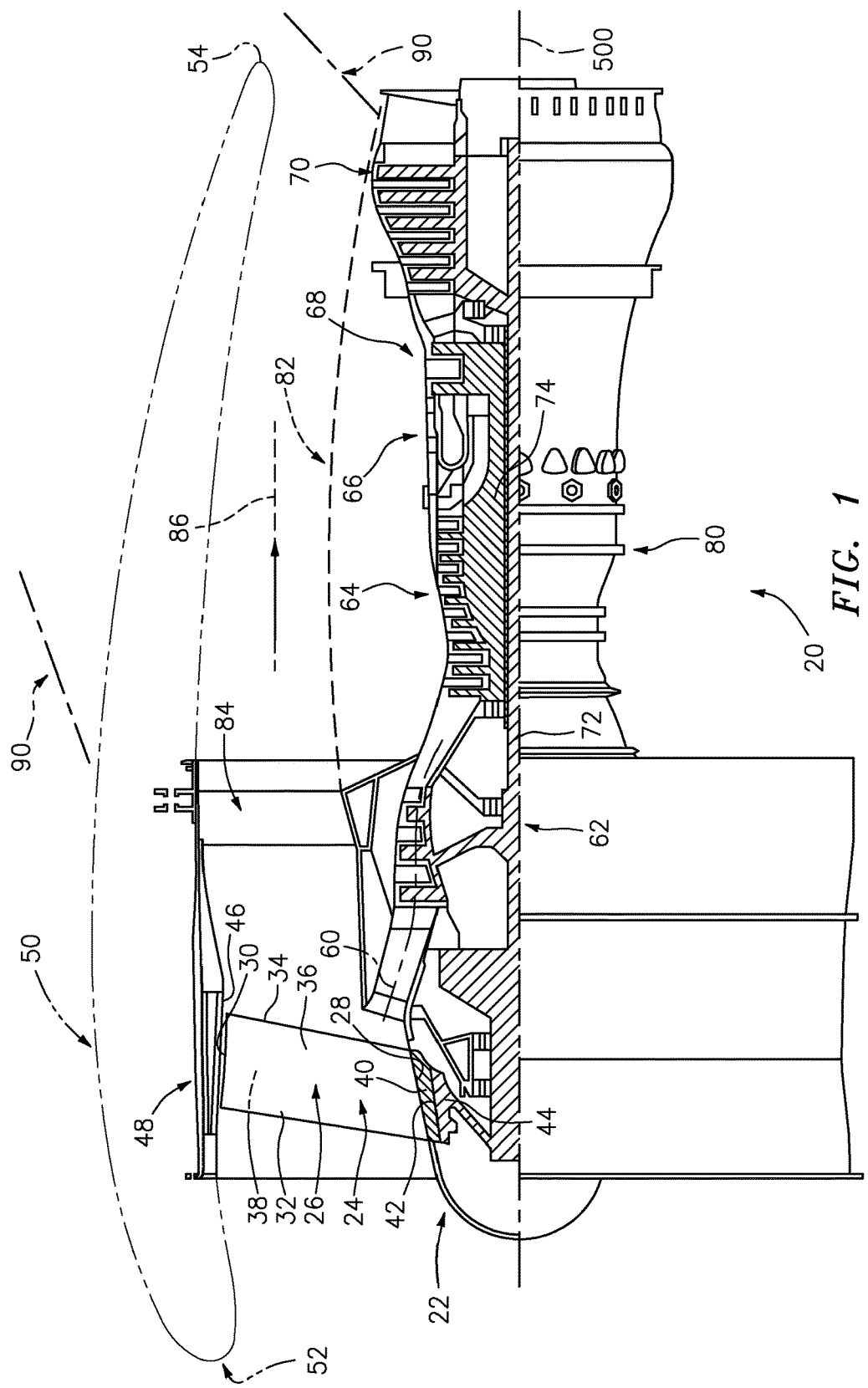
FIG. 1 is a partial axial partially sectional/cutaway view of a turbofan engine.

FIG. 1 shows a turbofan engine 20 having a centerline or central longitudinal axis 500. The engine includes a fan 22 at a forward/upstream end of the engine. The fan 22 has a circumferential array of fan blades 24. The exemplary blades 24 each have an airfoil 26 extending from a proximal end 28 to a distal end or tip 30. Each blade airfoil extends from a leading edge 32 to a trailing edge 34 and has pressure side 36 and a suction side 38. Inboard of the airfoil, each blade may include an attachment root 40 mounted in a complementary feature (e.g., a slot) 42 of a fan hub 44. The blade tips 30 are in close facing proximity to the inner/inboard surface 46 of a fan case 48. The exemplary fan case 48 is within an aerodynamic fan nacelle 50. The nacelle 50 extends from an upstream end/rim 52 to a downstream end/rim 54.

Downstream of the fan along a core flowpath 60 are, sequentially, one or more compressor sections 62, 64, a combustor section 66, and one or more turbine sections 68, 70. In the exemplary engine, there are two compressor sections and two turbine sections. The low pressure compressor section 62 is coupled to the low pressure turbine section 70 via a shaft 72. Similarly, the high pressure compressor section 64 is coupled to the high pressure turbine section 68 via a shaft 74. Driven by the respective turbine sections, the compressor sections sequentially compress a core flow of air received from the fan and deliver the compressed air to the combustor where the compressed air is mixed with fuel and combusted to generate high pressure combustion gases. These gases are sequentially expanded in the turbine sections to, in turn, drive the compressor sections. Each of the compressor sections and turbine sections may include one or more stages of blades interspersed with stages of vanes. The fan may be driven directly or indirectly by one of the turbine sections. For example, the fan may be coupled to the shaft 72 by a transmission so that the fan rotates about the centerline at a slower speed than does the shaft 72.

The core flowpath passes through an engine case 80. The engine case may be within an aerodynamic nacelle 82. Bearing systems may support the shafts and fan relative to the engine case for rotation about the centerline 500. A circumferential array of struts (fan exit guide vanes (FEGV)) 84 may position the fan case relative to the engine case. The exemplary struts 84 are aft/downstream of the fan and extend across a bypass flowpath 86 outboard of the core flowpath.

To mount the engine to an aircraft, a pylon 90 may have a proximal end (not shown) mounted to the aircraft fuselage or wing. A distal end of the pylon may mount to the engine. The exemplary mounting involves connection to both the fan case and the engine case.

The fan blades are subject to radial expansion due to inertial forces associated with fan rotation (centrifugal loading). The fan blades are also subject to thermal expansion which is influenced by the material properties of the fan blades (e.g., the coefficient of thermal expansion (CTE)). The fan case is also subject to thermal expansion. In operation, there typically is a gap or clearance between the fan blade tips and the adjacent inboard surface portion of the fan case. On the one hand, it is desirable to keep this gap small to maintain engine efficiency. On the other hand, it is generally desirable to avoid having this gap fully close which produces rub.

FIG. 2 shows further details of the fan case. The fan case includes a structural member/case comprising a containment case 100. The exemplary containment case is formed as a composite (e.g., having a structural core or body member of carbon fiber and epoxy resin). The exemplary containment case is a full circumference/hoop structure. The exemplary containment case extends from an upstream rim/end 102 to a downstream rim/end 104. The containment case 100 has an inner/inboard/ID surface 106 (FIG. 4) and an outer/outboard/OD surface 108.

Proximate the upstream end 102, the containment case has a radially outwardly projecting flange 110 (the forward or "A flange"). The fan case further includes a mounting ring structure 120 mounted to and encircling a downstream end portion of the containment case. The mounting ring structure may be formed of metal (e.g., titanium alloy or aluminum alloy) and may have a clevis or other mounting structure 122 for mounting to a forward engine amount of the pylon (e.g. via a mounting lug 124). From upstream to downstream, structures are mounted to the inboard surface 106 to define locally the outboard boundary of the air flowpath through the fan case. Several of these structures may be portions of a pre-assembled self-contained replaceable cartridge. In the illustrated example, proximate the upstream end 102 is a forward acoustic liner 130. This may be formed of a honeycomb (e.g., a potted honeycomb 132 (e.g., aluminum alloy) having a aluminum liner 134).

Downstream/aft of the forward acoustic liner 130 is an abradable liner assembly 140. The exemplary liner assembly 140 includes an abradable rub material 150 (e.g., filled epoxy with aramid honeycomb) having an inboard surface 152 in close facing proximity to the fan blade tips. The outboard (radially) surface of the abradable rub material 150 is mounted to the inboard surface of an aluminum (aluminum alloy) septum (not shown). The exemplary aluminum septum is essentially full annulus (either continuous as a single piece or as rigidly attached segments). The aluminum septum forms an inboard liner of a wedge honeycomb 160. In the exemplary embodiment, the septum and honeycomb 160 are circumferentially segmented. In alternative embodiments, one or both may be continuous. Along an outboard boundary of the honeycomb 160, it may bear a circumferentially continuous aluminum alloy liner/layer. The exemplary liner 170 forms the unifying outer structure of the replaceable cartridge as is further described below. The honeycomb 160 is a wedge in that its radial span or thickness increases from upstream to downstream to provide local convergence of the surface 152.

The abradable rub material 150 extends from a leading edge/rim 154 to a trailing edge/rim 155. The honeycomb 160 extends from a leading edge/rim 161 to a trailing edge/rim 162. In the exemplary embodiment these are axially aligned with corresponding ends of the abradable rub material 150 and septum. The exemplary liner 170 extends from a forward/upstream end/rim and 171 to an aft/downstream end/rim 172. From upstream to downstream, the exemplary liner 170 has three progressively radially inwardly staggered sections 173, 174, and 175 separated by annular shoulders 176 and 177.

The upstream section 173 is along the outer (radially outboard) surface of the honeycomb 132, with the upstream end/rim 171 axially aligned with the upstream end/rim of the honeycomb 132. This upstream section 133 is positioned relative to the inboard surface 106 of the containment case via radial dampers 178 and 179. Exemplary radial dampers are constructed from silicone rubber or other suitable damping material. They may be adhesively bonded to the outboard surface of the liner 170 (e.g., prior to installation of the cartridge). Exemplary dampers may be full annulus or segmented in their axial positioning and circumferential extent may be tailored to break up the natural frequency modes that may be found in the cartridge based on the frequency response requirements. If the cartridge has sufficient stiffness, such dampers may not be required.

To longitudinally and radially retain the forward portion of the cartridge (e.g., the forward portion of the forward acoustic liner 130) a flange structure may be provided (e.g., via the combination of the circumferentially segmented capture plate 136) having an outboard portion with the aft face secured against a forward face of the flange 110 (e.g., via fasteners such as bolts). The exemplary capture plate extends from an outboard (outer diameter or OD) periphery to an inboard (inner diameter or ID) periphery. The flange further includes a close out plate 137 having, in axial section, a generally L shape/section with a radially outwardly extending leg 138 and an aftward/downstream extending foot 139 (forming a sleeve structure). The close out plate may similarly be circumferentially segmented and an outboard portion of the leg 138 may be secured to an inboard portion of the capture plate (e.g., via bonding and riveting). An outboard face of the foot captures a forward portion of an inboard surface of the forward liner (e.g., of the liner 134).

Essentially longitudinally coextensive with the wedge honeycomb 160 and abradable rub material 150, a ballistic liner 180 (e.g., aramid fiber) may also be provided and secured with its outboard surface along the inboard surface 106 of the containment case. The exemplary ballistic liner comprises a plurality of aramid plies and epoxy resin. It may be pre-cured and secondarily bonded or co-cured with the composite containment case. Anti-rotation features (discussed below allowing relative radial movement but not rotation) may be bonded to the inner surface of this liner or forward or aft directly to the fan case. Downstream/aft of the honeycomb wedge 160, abradable rub material 150 and ballistic liner 180 is an ice impact liner 182 (e.g., formed of an aluminum honeycomb with impact resistant flowpath liner (e.g., aramid fiber). Downstream of the ice impact liner 182 is an acoustic liner (assembly) 186 which may include an aluminum honeycomb and an inboard/ID liner (e.g., of aluminum or aramid fiber). Downstream of the acoustic liner assembly 186 the guide vane (i.e., 84) ring may be mounted to the downstream portion of the containment case and the mounting ring 120. A recirculation seal/damper 187 may be positioned axially between the ice impact liner 182 and the wedge honeycomb (e.g., to help maintain aero smoothness and damp movement of the cartridge in the axial direction (and optionally in the radial direction)).

Figure 6:
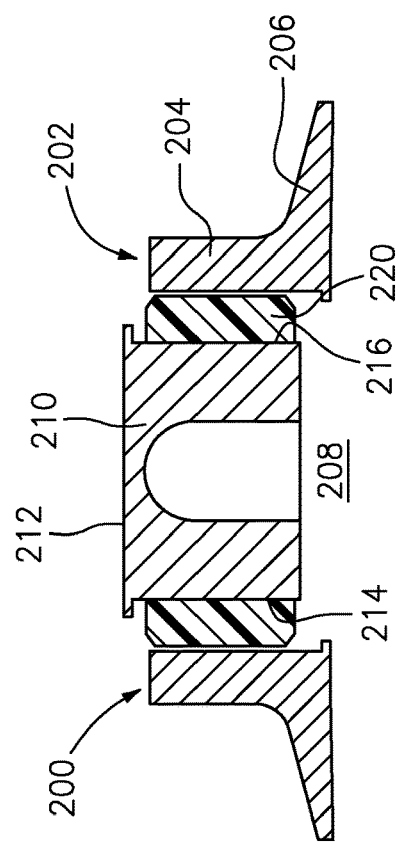
FIG. 6 is a second isolated transverse sectional view of the attachment apparatus taken along line 6-6 of FIG. 4.
Figure 5:
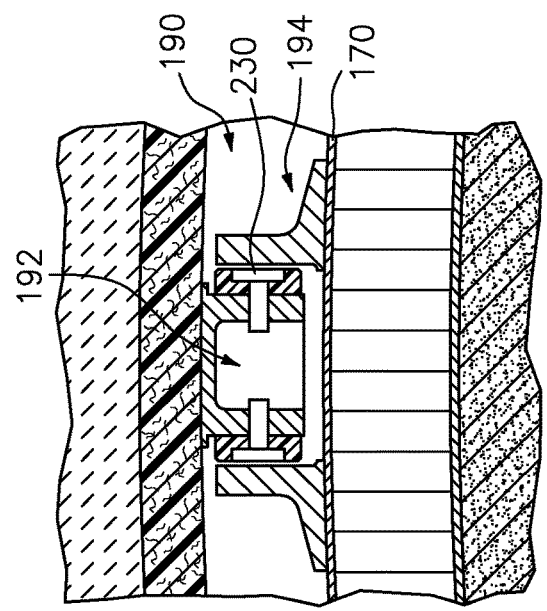
FIG. 5 is a first transverse sectional view of a liner attachment apparatus taken along line 5-5 of FIG. 4.

A radially compliant/accommodating attachment system comprises a circumferential array of sets 190 (FIG. 5) of wear assemblies 192 and receiving members 194. Each wear assembly is accommodated in an associated said receiving member. The exemplary wear assemblies are mounted to the inboard/ID surface of the ballistic liner. The exemplary receiving members are mounted to the outboard/OD surface of the ring 170. In the exemplary implementation, this is along the downstream section 175. Each receiving member forms a compartment receiving the associated wear assembly. The exemplary receiving members are formed by a pair of longitudinally extending L sectioned brackets 200, 202 (FIG. 6). Each bracket has (when viewed in section) a leg 204 and a foot 206. The exemplary feet 206 point circumferentially oppositely outward from a channel 208 formed between the legs. The exemplary undersides of the feet are mounted to the outboard/OD surface of the liner 170 (e.g., via thermoset adhesive (e.g., epoxy) and/or mechanical fasteners (e.g., rivets)).

In an exemplary implementation, the fan blades and its hub (collectively fan) are made of metal (e.g., an aluminum alloy or a titanium alloy). The fan containment case is formed of a much lower CTE material. The cartridge structural material (forming the driver of its thermal expansion/contraction) may have a CTE closer to that of the fan blades (e.g., within 5% of the CTE of the fan blades, more broadly, within 7%). In the exemplary embodiment, the fan blades are made from aluminum and the structural components of the cartridge are made from aluminum. Take-off conditions may result in hot temperatures (e.g., ~120 F (~50 C)). The cartridge will expand circumferentially. Because of the anti-rotation features, the cartridge is forced to expand radially outward. The fan blades will also grow radially by a similar amount because of the similar materials. At cruise conditions, fan temperatures are very low (e.g., −65 F (~−50 C) or so). The cartridge will tend to shrink because of the cold temperatures. The anti-rotation features force the cartridge to move inward radially as the hoop contracts. The fan blades will also shrink because of the cold temperatures by a similar amount. In this way, a passive clearance system can be created which essentially eliminates any negative thermal effects on clearance.

As is mentioned above, the exemplary containment case 100 has a structural core or body member comprising a carbon fiber-reinforced matrix (e.g., epoxy resin). In locations where metallic features may be mounted to the structural core (or vice versa) the containment case 100 may further include molded polymer members intervening between the material of the structural core 300 and the metal. These may include situations where engagement between the containment case 100 and the metal feature is annular.

Figure 4A:
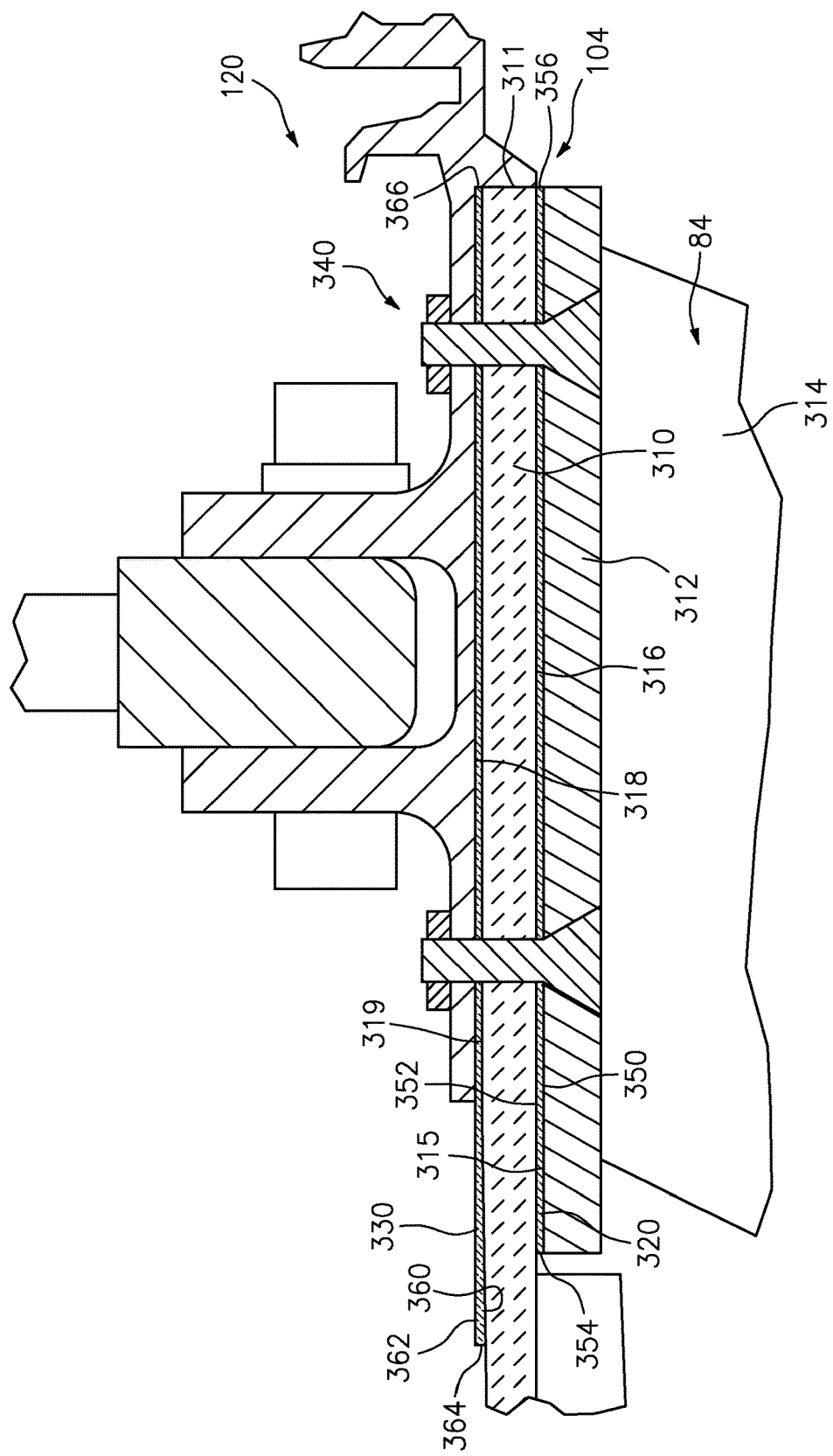
FIG. 4A is an enlarged view of an aft portion of the forward liner cartridge region of the assembly of FIG. 4.

Two examples of such engagement are seen in FIG. 4A wherein an aft portion 310 of the structural core 300 is radially sandwiched between outer diameter (OD) or outboard shroud segments 312 of the fan exit guide vanes 84 (airfoils 314 of the vanes also being shown) and the mounting ring structure 120. FIG. 4A shows an inner diameter (ID) member 320 between the outboard/OD surface 315 of the shroud segments 312 and the inboard/ID surface 316 of the structural core aft portion 310. FIG. 4A further shows an outer diameter (OD) member 330 between the outboard/OD surface 319 of the structural core aft portion 310 and the inner/ID surface 318 of the ring 120. Fasteners 340 (e.g., screws engaging nuts or rivets) may secure this radial sandwich of shroud segments 312, containment case aft portion 310, ring 120, and members 320 and 330.

FIG. 4A further shows the member 320 having an inboard/inner diameter (ID) surface/face 350, an outboard/outer diameter (OD) surface/face 352, a forward rim 354, and an aft rim 356. FIG. 4A further shows the member 330 having an inboard/inner diameter (ID) surface/face 360, an outboard/outer diameter (OD) surface/face 362, a forward rim 364, and an aft rim 366.

As is discussed further below, the members 320 and 330 may have one or more of several functions. First, they may provide electrical/galvanic isolation between the adjacent/contacting metal members and the structural core. Second, they may provide a machinable surface to allow machining so as to provide a relatively precise interface for engaging the metal. As is discussed further below, the exemplary members 320 and 330 are segmented and formed by pre-molded segments of a fiber-filled polymer and integrated with the structural core 300 during layup and cure. Thereafter, they may be machined (e.g., mechanically milled) to final dimensions.

Figure 4C:
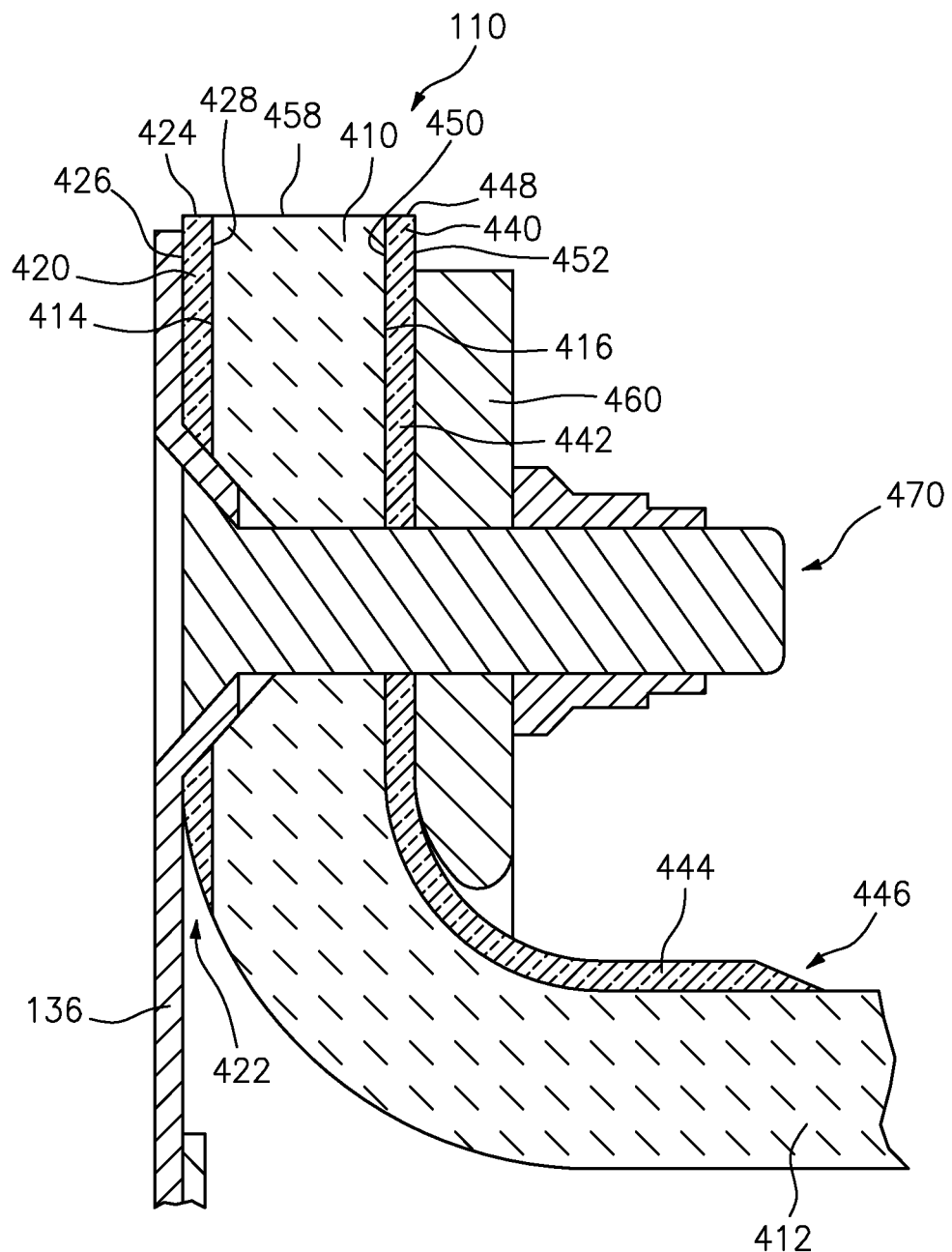
FIG. 4C is an enlarged view of the forward portion of the assembly of FIG. 4B.

FIGS. 4B and 4C show another situation in which such members may be used. FIG. 4C shows a portion 410 of the structural core extending along the flange 110 and transitioning from a main body portion 412 of the structural core. The portion 410 has a forward surface/face 414 and an aft surface/face 416. A first member 420 is sandwiched between the portion 410 and the capture plate 136. The exemplary member 420 is annular (segmented annular as discussed further below) extending radially from an inboard rim 422 to an outboard rim 424 and having a forward face 426 and an aft face 428.

Similarly, a member 440 may be positioned along the aft face 416. In this example, the member 440 has a generally L-shaped axial/radial section with a radial leg 442 and an axial foot 444. The member 440 thus extends from an inboard/aft rim 446 at an end of the foot to an outboard rim 448 at an outboard end of the leg. The member 440 has a first surface 450 which is generally forward along the leg and inward along the foot and a second surface opposite thereto 452 which is generally aft along the leg and outboard along the foot. The exemplary leg is positioned between the aft surface 416 of the flange and a segmented radius block (e.g., aluminum) 460. This sandwich may be axially secured by a circumferential array of fasteners 470 (e.g., threaded fasteners such as screws engaging nuts or rivets).

As mentioned above, the exemplary annular members 320, 330, 420, 440 are formed as segmented members, each being the end-to-end circumferential array of a plurality of individual segments.

The exemplary segmentation of members 320 and 330 involves segments (respectively 320-1 of FIG. 7 and 330-1 of FIG. 8) of rectangular planform having forward/front/upstream/leading edges 354-1; 364-1 parallel to rear/aft/trailing/downstream edges 356-1; 366-2 and respective circumferential lateral edges or ends 380, 382; 384, 386 normal thereto and ID surfaces/faces 350-1; 360-1 and OD faces 352-1; 362-1. In some implementations, they may be molded flat and then bent during assembly. In other implementations, they may be pre-molded with their arcuate final shape.

Similarly, the exemplary segmentation of members 420 and 440 may involve annular segments (respectively 420-1 of FIG. 9 and 440-1 of FIG. 10). The annular segments of the exemplary member 420 may be pre-molded with inboard rim sections 422-1, outboard rim sections 424-1, fore 426-1 and aft 428-1 faces, and first 430 and second 432 circumferential or lateral edges or ends. The annular segments of the exemplary member 440 may be pre-molded with inboard/aft rim sections 446-1, outboard rim sections 448-1, first 450-1 and second 452-1 faces, and first 454 and second 456 circumferential or lateral edges or ends.

Figure 11:
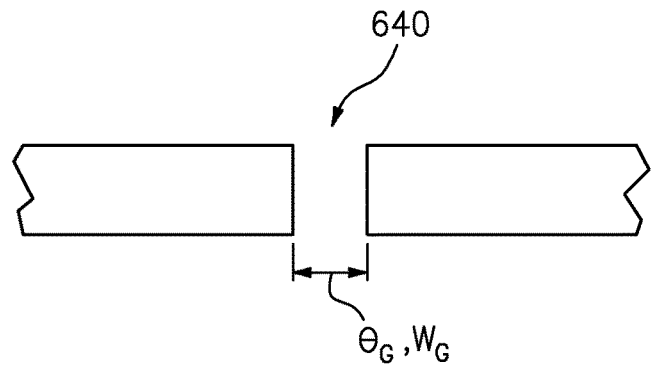
FIG. 11 is a view of a first segment-to-segment junction.

When the segments are assembled, they may be assembled end-to-end with a first circumferential or lateral edge/end of one segment being adjacent the second such edge/end of the adjacent segment. The segments may be abutting or slightly spaced apart. FIG. 11 shows a gap 640 between adjacent ends. The gap has a circumferential angular span $\theta_G$ relative to the engine centerline and a nominal width $W_G$. Exemplary $\theta_G$ is up to 0.3°, more particularly, 0.03° to 0.3° or 0.05° to 0.2°. Exemplary $W_G$ is up to 5 mm, more particularly up to 3 mm or 0.5 mm to 5 mm or 1 mm to 3 mm, more particularly, about 1.5 mm. Advantageous $W_G$ may be relatively less sensitive to fan case diameter than $\theta_G$. Exemplary ring diameters are 1 m to 4 m, with a particular example at about 2 m.

Figure 12:
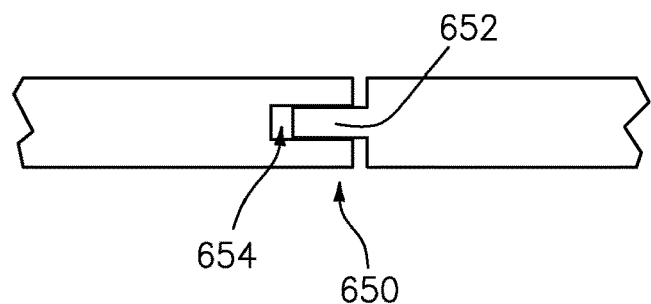
FIG. 12 is a view of a second segment-to-segment junction.

Among many alternatives are mechanical joints between segments. FIG. 12 shows one such tongue-and-groove joint 650 wherein the first circumferential end/edge of each segment has a tongue 652 and the second circumferential end/edge has a groove 654. The tongue of each segment mates with the adjacent groove of the adjacent segment and vice-versa to provide physical integrity for the annular structure. The exemplary embodiment shows that, for ease of manufacture and manufacturing tolerance, the tongue-and-groove need not be fully mated.

Figure 13:
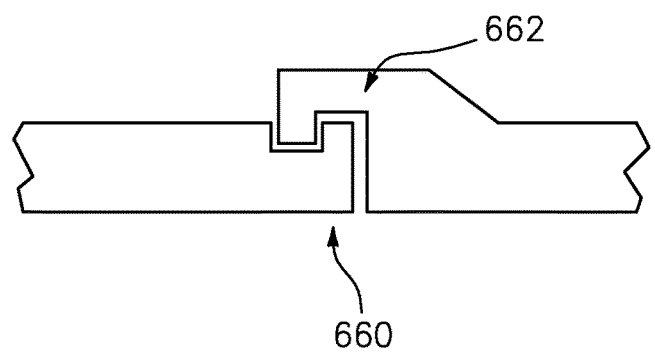
FIG. 13 is a view of a third segment-to-segment junction.

FIG. 13 shows an exemplary oversized hook joint 660 with a radially outwardly protruding portion 662 at one end of each member interfitting with the opposite end of the adjacent member. The protruding portion may be machined off after curing.

Figure 14:
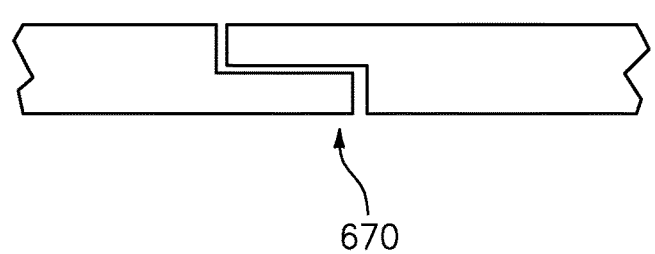
FIG. 14 is a view of a fourth segment-to-segment junction.
Figure 15:
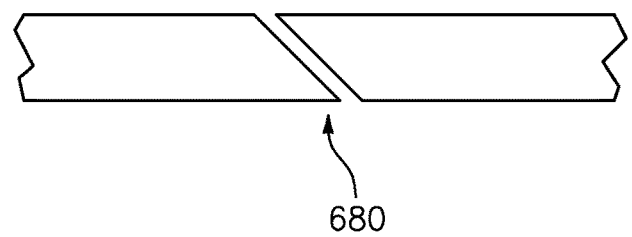
FIG. 15 is a view of a fifth segment-to-segment junction.

FIG. 14 shows a simple overlap splice joint 670. FIG. 15 shows a simple angled scarf joint (e.g., at about 45°) 680. Slight gap/compliance in such joints allow accommodation of manufacturing tolerances without producing full radial gaps in the final product.

Figure 16:
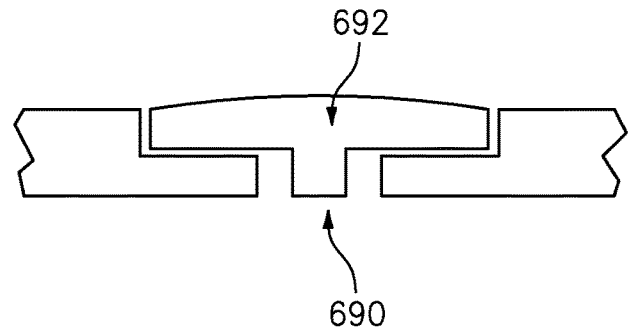
FIG. 16 is a view of a sixth segment-to-segment junction.

FIG. 16 shows a splice joint 690 wherein a splice member 692 of short circumferential extent spans between adjacent ends of larger segments and interfits therewith.

Figure 17:
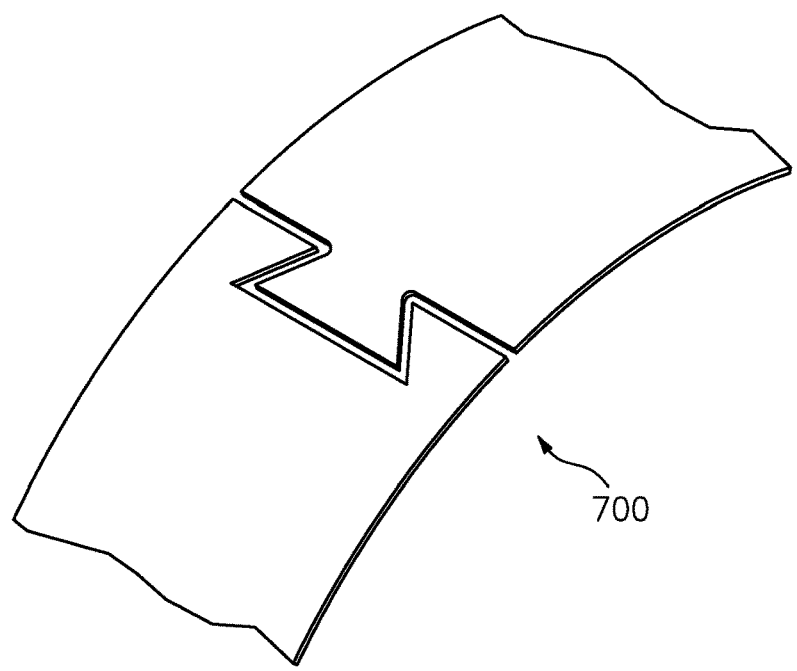
FIG. 17 is a view of seventh segment-to-segment junction.
Figure 18:
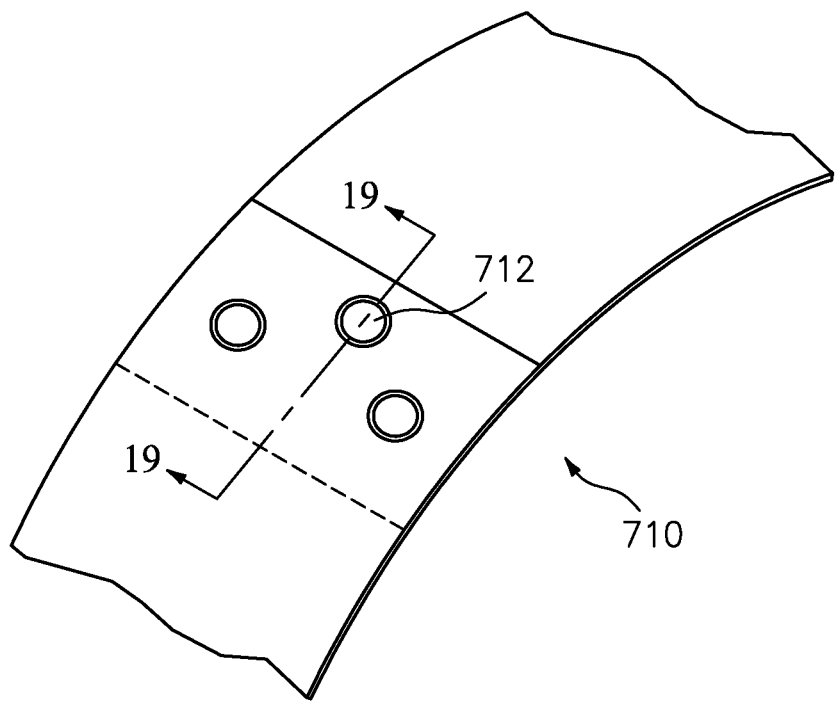
FIG. 18 is a view of an eighth segment-to-segment junction.
Figure 19:
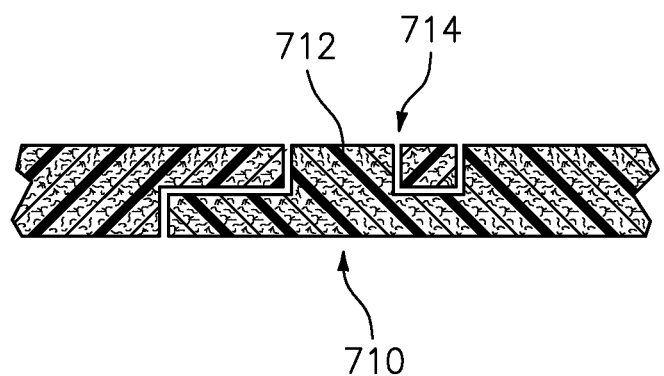
FIG. 19 is a sectional view of the junction of FIG. 18, taken along line 19-19.

FIG. 17 shows a dovetail joint 700. Whereas the views of FIGS. 13-16 are edge-on, such a dovetail joint 700 may be edge-on or, as shown, may be planform along a face of the segments rather than an edge of the segments. Similarly, FIG. 18 shows a molded pin in overlap splice joint 710 wherein pins 712 in an overlapping portion of one member interfit with sockets 714 (FIG. 19) in the overlapping portion of the other segment.

Exemplary segment count in a given member are 4-30, more particularly, 4-10. A particular exemplary number of segments with a fan case diameter of about 2 m is 6 segments of nominal 60° span each. The number of segments may depend upon the overall size of the annular member in view of available molding equipment (which determines the maximum size of a given segment that can be molded). Exemplary segment characteristic thickness $T_S$ (post-machining) (e.g., mean, median, or mode) is at least 0.25 millimeters or 0.5 millimeters or 1.0 millimeters to 5.0 millimeters, more particularly, 0.25 millimeters to 1.5 millimeters or 0.5 millimeters to 1.0 millimeters. At molding, this will be greater (e.g., an exemplary 25% to 200% thicker). This exemplary as-molded thickness may be an exemplary 1 millimeters to 5 millimeters or 2 millimeters to 4 millimeters.

Exemplary polymer matrix is a polyetherimide (PEI). Exemplary PEI is available under the trademarks Ultem 2200 (SABIC Innovative Plastics US LLC, Mt. Vernon, Ind.) and RTP-2103 (RTP Corporation, Winona, Minn.). Other materials may be used, especially those having equivalent or near equivalent properties (e.g., service temperature (e.g., at least 150° C.), compressive strength, resistance to aircraft fluids, galvanic potential, and the like).

In an exemplary manufacture process, the segments are separately molded via a thermoplastic injection molding process. In an exemplary process, short glass fibers are blended into the PEI resin prior to injection (e.g., in contrast to directional reinforcement such as a fabric or tape). Exemplary fiber content of the segments is about 30% by weight (e.g., 29% to 31%, more broadly zero to 50% or 10% to 40% or 25% to 35%).

After molding, the segments may receive a surface preparation process such as abrading (e.g., via grit blasting) and cleaning for facilitating adhesive bonding to the fan case laminate.

The ID member segments 320 are placed on the outer surface of a mandrel (e.g., cylindrical or other body of revolution) that is utilized to form the inner (ID) surface of the molded fan case. The outboard flange member 420 segments may be applied to a shoulder of the mandrel. In other variations, the flange segments are all applied later.

Particularly where the axis of the mandrel is oriented horizontally, some means are required to hold the segments in place on the mandrel. The means can be features molded into the segments that interlock from segment to segment to hold the series of segments in place (e.g. joints discussed above). Exemplary such means include tongue-and-groove joints or other interfitting features. An alternative or additional means comprises adhesive tape applied across the joints or gaps between adjacent segments.

A layer of adhesive may be applied to the outer surface of the segments. An exemplary adhesive is a film. An exemplary adhesive (film or other) is an epoxy. An exemplary epoxy film is a scrim-supported film. An exemplary scrim is a nylon mesh. Other features may be pre-applied to the mandrel. For example, the plies of the ballistic liner 180 may be pre-applied to the mandrel (e.g., as pre-preg. tape, tow, or the like) prior to applying the containment case structural core material.

The fan case structural core 300 laminate is installed over the segments. This may comprise a multi-layer tape or tow application of the exemplary carbon fiber material. The material may be formed as a pre-preg. or matrix-forming resin may be separately applied. An exemplary application involves a combination of prepreg. tape layers and prepreg. fabric sheet layers.

Once the fan case laminate is installed, a layer of film adhesive (e.g., as discussed above) may be applied over the outer surface of the laminate in the region(s) where the remaining segments will be installed.

The remaining segments are placed on the laminate and the segments are held in place using a method similar that described above. In a first example, the remaining segments are the OD member 330 segments and the flange aft member 440 segments. In an alternative example, these include both the flange front member 420 segments and aft member segments.

The fan case laminate and segments are prepared for curing of the fan case laminate and other adhesive (e.g., by vacuum bagging). Exemplary curing is via autoclave (e.g., steam-assisted autoclave).

The fan case with the segments may be removed from the mandrel and the bag (if any) removed.

The exposed surfaces of the segments are machined to the final dimensional requirements. Exemplary machining involves turning the case on a lathe. The exemplary machining machines the ID face of the member 320, the OD face of the member 330, the front face of the member 420 and the aft face of the member 440. This also may include machining the OD rim portions of the members 420 and 440 and structural core flange rim 458. It may also involve machining rear rims of the members 320 and 330 and the rear end/rim 311 of the structural core end portion 310. After the turning, the holes may be drilled through the segments and carbon fiber of the structural core.

Assembly of remaining fan case components (e.g., the liner, and mount ring) and assembly of the remaining engine components may be as known in the art or yet-developed.

In one example, differential thermal expansion is used to facilitate insulation of the FEGV array and ring. For example, the FEGV array may be cooled and the ring 120 heated to alloy the FEGV array to fit within the portion 310 and the ring 120 to fit over the portion 110. Upon thermal equalization, a radial interference fit results. In alternative embodiments, only the ring is heated and creates an interference fit with the segmentation of the FEGV array allowing later installation without interference.

In one example, the machining of the ID surface 350 is delayed and performed only after assembly to the mount ring so that dimensional control is maximized.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A turbine engine fan case (48) comprising:
    a composite body member (300) circumscribing an axis (500) and having an annular mounting portion (310, 410) along a portion of the composite body member less than full length of the composite body member and selected from the group consisting of a radially outwardly projecting flange (110) and an aft portion of the composite body member;
    a segmented polymer member (320, 330, 420, 440) along the annular mounting portion and integrated therewith; and
    a metallic member (312, 120, 136, 460) mounted to said segmented polymer member, the metallic member selected from the group consisting of:
    a mounting ring (120);
    a fan exit guide vane (84, 312) array; and
    a liner capture plate (136).

2. The turbine engine fan case of claim 1 wherein:
    the composite body member comprises a carbon fiber-reinforced composite.

3. The turbine engine fan case of claim 1 comprising:
    the segmented polymer member is a segmented fiber-filled polymer member.

4. The turbine engine fan case of claim 3 wherein:
    the fiber-filled polymer comprises glass fiber.

5. The turbine engine fan case of claim 3 wherein:
    the fiber-filled polymer comprises polyetherimide (PEI) polymer.

6. The turbine engine fan case of claim 3 wherein:
    the segmented fiber-filled polymer member has a characteristic thickness of 0.25 millimeters to 1.5 millimeters.

7. The turbine engine fan case of claim 3 wherein:
    the segmented fiber-filled polymer member has a fiber content of 10% to 40% by weight.

8. The turbine engine fan case of claim 3 wherein:
    the segmented fiber-filled polymer member has 4-30 segments.

9. The turbine engine fan case of claim 3 wherein:
    the segmented fiber-filled polymer member combines for at least 300° of an annulus.

10. A method for manufacturing the turbine engine fan case of claim 1, the method comprising:
    laying up the composite body member;
    applying the segmented polymer member to the annular mounting portion; and
    curing the composite body member.

11. The method of claim 10 wherein:
    the segmented polymer member is of a first said segmented polymer member; and
    a second segmented polymer member is applied to a mandrel and the laying up is atop the second segmented polymer member.

12. The method of claim 10 further comprising:
    after the applying and the curing, machining the segmented fiber-filled polymer member.

13. A turbine engine fan case (48) comprising:
    a composite body member (300) circumscribing an axis (500) and having an annular mounting portion (410) along a portion of the composite body member less than full length of the composite body member, the annular mounting portion (410) being a radially-outwardly projecting flange; and
    a segmented polymer member (420, 440) along the annular mounting portion and integrated therewith.

14. The turbine engine fan case of claim 13 wherein:
    a first said segmented fiber-filled polymer member (420) is along a first face (414) of the flange; and
    a second said segmented fiber-filled polymer member (440) is along a second face (416) of the flange opposite the first face to sandwich the flange between the first and second said segmented fiber-filled polymer members.

15. The turbine engine fan case of claim 13 wherein:
    a metallic member is mounted to said segmented polymer member.

16. The turbine engine fan case of claim 15 wherein:
    the metallic member is
    a liner capture plate (136).

17. A turbine engine fan case (48) comprising:
    a composite body member (300) circumscribing an axis (500) and having an annular mounting portion (310, 410) along a portion of the composite body member less than full length of the composite body member and being an aft portion of the composite body member; and
    a segmented polymer member (320, 330, 420, 440) along the annular mounting portion and integrated therewith, wherein:
    the mounting portion (310) has an inner diameter (ID) surface and an outer diameter (OD) surface along said aft portion; and
    at least one of:
    a first said segmented fiber-filled polymer member is along the ID surface; and
    a second said segmented fiber-filled polymer member is along the OD surface.

18. The turbine engine fan case of claim 17 wherein:
    a metallic member (312, 120, 136, 460) is mounted to said segmented polymer member; and
    the metallic member is selected from the group consisting of:
    a mounting ring (120); and
    a fan exit guide vane (84, 312) array.

19. The turbine engine fan case of claim 18 wherein:
said first segmented fiber-filled polymer member is along the ID surface; and
said second segmented fiber-filled polymer member is along the OD surface axially overlapping the first segmented fiber-filled polymer member.

20. A turbine engine comprising:
a fan having a plurality of blades having respective blade tips; and
a fan case comprising:
a composite body member circumscribing an axis and having an annular mounting portion along a portion of the composite body member less than full length of the composite body member and selected from the group consisting of a radially outwardly projecting flange and an aft portion of the composite body member; and
a segmented polymer member along the annular mounting portion and integrated therewith, wherein the segmented polymer member is spaced axially away from the blade tips.

* * * * *